United States Patent [19]

DiCicca et al.

[11] Patent Number: 4,571,342

[45] Date of Patent: Feb. 18, 1986

[54] CHARCOAL BROILED FLAVOR COMPOSITION

[75] Inventors: Franscesco DiCicca, Ramsey; Farid M. Fahmy, Clifton; Ferdinand Triolo, Jackson, all of N.J.

[73] Assignee: General Foods Corporation, White Plains, N.Y.

[21] Appl. No.: 554,165

[22] Filed: Nov. 22, 1983

Related U.S. Application Data

[63] Continuation of Ser. No. 291,755, Aug. 10, 1981, abandoned.

[51] Int. Cl.[4] .............................................. A23L 1/231
[52] U.S. Cl. .................................... 426/533; 426/574; 426/589; 426/590; 426/650
[58] Field of Search ............... 426/533, 312, 574, 589, 426/590, 520, 650

[56] References Cited

U.S. PATENT DOCUMENTS

| | | | |
|---|---|---|---|
| 3,348,954 | 10/1967 | Green | 426/589 X |
| 3,394,017 | 7/1968 | Giacino et al. | 426/533 |
| 3,532,514 | 10/1970 | May | 426/589 X |
| 3,846,568 | 5/1974 | Liepa et al. | 426/364 |
| 4,094,997 | 6/1978 | Aishima et al. | 426/533 |

OTHER PUBLICATIONS

Swern, D., "Bailey's Industrial Oil and Fat Products," John Wiley and Sons, N.Y., 1979, pp. 144-149.

*Primary Examiner*—Robert Yoncoskie
*Attorney, Agent, or Firm*—Linn I. Grim; Thomas A. Marcoux; Daniel J. Donovan

[57] ABSTRACT

A flavoring composition with charred meaty notes is prepared by subjecting a film of fat or oil to temperatures within the range of 150° C. to 475° C. in the presence of oxygen for an effective period of time, followed by collecting the fat or oil.

20 Claims, No Drawings

CHARCOAL BROILED FLAVOR COMPOSITION

This application is a continuation of application Ser. No. 291,755, filed Aug. 10, 1981, now abandoned.

BACKGROUND OF INVENTION

This invention is concerned with preparing a novel flavoring composition which has the flavor and aroma similar to that obtained upon charcoal broiling a food, especially beef, and to foodstuffs which employ this flavoring composition.

Food products enhanced with meat-like flavors are well known and have long been used. There is a considerable demand for meat flavored products in which the actual meat, such as beef, is reduced in amount or completely absent. For example, in the preparation of some sauces and purees, or meat analogs, pet foods or meat extended products, the meat flavor is desired without the meat being present in the amounts needed to impart the desired meat flavor. Additionally, where the flavor from a particular cooking process, i.e. charcoal broiling, is desired it may not always be convenient to carry out the cooking process with the foodstuff.

Interest in a flavor which can impart a charcoal broiled meat flavor to food has been evident for some time. Nevertheless, the approaches heretofore employed have not given rise to a flavor which would be practically significant. One technique employed is capturing the highly fugitive flavor essence from cooking meat. This has met with only limited success because of a number of factors, including the comparatively low concentration in which the flavor essence is found and instability of the mixture of substances which make up the essence. Another technique is to obtain a meat extract. However, upon addition to a foodstuff there have been tendencies to develop an undesirable off-taste and an undesireable dark color, as well as being an expensive and time consuming process.

Accordingly it is a feature of the present invention to provide a novel flavoring composition.

Another feature of the invention is to provide a flavoring composition which imparts a charcoal broiled meat flavor.

A further feature of the invention is to provide a foodstuff with a charcoal meat flavor.

SUMMARY OF THE INVENTION

Basically, the features of this invention are carried out by subjecting a film of fat or oil to temperatures within a range of 150° C. to 475° C. in the presence of oxygen for a period of time effective to develop charcoal or charred meaty flavor notes and collecting the treated fat or oil to prepare a flavoring composition. Preferably flavor precursors are added to the fat or oil prior to the high temperature treatment to enhance the meaty flavor development in the resultant flavoring composition.

DETAILED DESCRIPTION OF INVENTION

It has been discovered that a novel flavoring composition having the flavor and aroma characteristics of a charcoal broiled meat, particularly beef, can be prepared by the treatment of a film of fat or oil under high temperatures within the range of 150° C. to 475° C. for an effective period of time and in the presence of oxygen. This flavoring composition can be used to provide charcoal or charred meaty flavor and aroma notes to a variety of foodstuffs including meat analogs, meat extended products (e.g. pet foods), beverages, sauces (gravies), soups, spreads, coating mixes, etc. This flavoring composition can be used to impart a meaty flavor in food products which contain no meat, as well as food products which contain a percentage or are wholly composed of meat. In one application this flavoring composition can be used in a condiment (seasoning) and can be applied directly onto a variety of foodstuffs including hamburgers, beef, etc. and cooked by a variety of means (broiling, frying, microwave cooking etc.) while obtaining the flavor of charcoal broiling.

The fat or oil can be from any one of a variety of sources such as beef tallow, vegetable oils such as partially hydrogenated soy oil, partially hydrogenated cotton seed oil, coconut oil, palm oil, corn oil, safflower oil, peanut oil, etc. or combinations thereof. The term fat or oil includes any glycerides of fatty acids with the distinction between the term fat and oil being that fat is solid at room temperature and oil is liquid at room temperature.

A film of fat or oil critically is subject to a high temperature treatment in the presence of oxygen, followed by collecting the treated fat or oil. The temperature must be within the range of 150° C. to 475° C., preferably about 285° C. to 360° C. Within this temperature range some unidentified reaction or interaction takes place in the presence of oxygen which results in the development of the charcoal or charred meaty notes of the flavoring composition of this invention. At temperatures above 475° C. objectionable flavors are developed, while at temperatures below 150° C. the desired charcoal broiled taste development as well as the desired concentration of flavor development, is not observed.

The fat or oil is subjected to the high temperature treatment in the form of a film (i.e. a thin layer, sheet or droplets) which maximizes the exposure of the fat or oil to oxygen at the required temperatures to obtained the desired charcoal broiled, meaty taste development. In general, the film or fat or oil will have a thickness of less than 5 mm, preferably less than 1 mm. A preferred method of subjecting the fat or oil to this high temperature treatment is to employ a continuous feed, thin film, high temperature cooking process wherein the film is exposed to oxygen (i.e. air) during this treatment process. The flavor development at the high temperature in the presence of oxygen takes place almost instantaneously, with the period of time being that which is effective to develop the charcoal broiled meat flavor.

In order to enhance the meaty flavor notes that are developed during the high temperature treatment of the fat or oil, a flavor precursor is preferably added to the oil prior to this high temperature treatment. The preferred flavor precursors are sulfur containing vegetables, sulfur containing amino acids, ascorbic acid, yeast, or combinations thereof. The flavor precursors are preferrably added to the fat or oil, subjected to a precooking process (e.g. cooking at 120° C. for twenty minutes) to uniformly combine and react the flavor precursors with the fat or oil, then filtered, followed by subjecting the precursor-fat or oil mixture to the high temperature treatment. This could be carried out as a continuous process. The identified flavor precursors are generally used within the following ranges: sulfur containing vegetables (e.g. garlic, onion, etc.) at 0.5 to 4%, preferrably 1 to 2%; the sulfur containing amino acids (e.g. cysteine amino acid, thiamin-HCL) at 1 to 6%, preferrably 2 to 4%; ascorbic acid at 0.5 to 3%, preferrably 1 to 2%; and yeast (e.g. autolyzed or inactivated yeast), at 2 to 8%, preferably 3 to 4%, all percents being by weight of the fat or oil.

In order to further protect the flavoring composition from deterioration over storage and to deliver a dry flowable form, it is preferrably combined with a carrier which can encapsulate the flavoring composition. These carriers can be any one of a number of suitable carriers such as dextrins (e.g. malto dextrins), gums (e.g. gum arabic), starches (e.g. modified starches), modified cellulose (e.g. microcrystalline cellulose), corn syrup solids, and fat. One method of combining the carrier with the flavoring composition involves forming an emulsion or solution of the carrier and flavoring composition, then codrying the flavoring composition and the carrier, as by spray drying. In general, the flavoring composition is fixed in the carrier at a level of 5 to 40%, preferably 20 to 30%, by weight of the carrier-flavoring composition.

The flavoring composition either by itself, or when fixed in or on a carrier can then be incorporated in a wide variety of foodstuffs to impart a desireable meaty charcoal broiled flavor to the foodstuff.

EXAMPLE I

The following ingredients were mixed together in an open reaction vessel:

| Ingredient | % by weight |
| --- | --- |
| L-Cysteine HCl | 2 |
| L-Ascorbic Acid | 1 |
| Onion Juice Concentrate | 1 |
| Antolyzed Yeast | 3 |
| Vegetable oil (partially hydrogenated cottonseed and soy oil) | 93 |
|  | 100 |

The mixture was heated to 120° C. while stirring, and this temperature was maintained for 15 to 20 minutes. The mixture was then allowed to sit for 10 to 15 minutes, followed by filtering the mixture.

The filtrate was subjected to the high temperature treatment at a temperature of about 340° C., in a continuous flow, thin film apparatus comprising a glass tube 21.3 cm long and 4 mm in diameter within a heated jacket with a feed rate of about 2 to 3.5 mls/min, a film thickness of about 0.5 mm and with a constant flow of air across the film. The resultant flavor composition was collected and when tasted possessed a meaty, charcoal broiled flavor.

EXAMPLE II

The flavor composition as prepared in Example I was then used to flavor the food products as follows:

A hamburger analog was prepared containing: 80.85% by weight hydrated textured vegetable protein; 18% by weight of beef tallow; 0.75% by weight of the flavor composition; and 0.4% by weight of salt. The hamburger analog was formed into patties and broiled. The resultant hamburger analog had a charcoal broiled, meaty flavor and aroma.

An extended hamburger was prepared containing: 47.4% by weight of ground chuck; 47.4% by weight hydrated textured vegetable protein; 3.8% by weight beef tallow; and 1.4% by weight of the flavor composition. Hamburger patties were formed and broiled. The resultant hamburgers had a charcoal broiled, beefy, meaty flavor and aroma.

A commerical cheese spread was flavor enhanced by mixing in 2% by weight of the flavor composition which imparted a charcoal broiled, meaty flavor to the cheese spread.

A commercial dry pea soup mix was flavor enhanced by adding 1.4% by weight of the flavor composition to the dry mix. Upon reconstitution the pea soup had a charcoal broiled, meaty (ham-like) flavor.

A commercial catsup was flavor enhanced by adding 1.5% by weight of the flavor composition to the catsup. The resultant catsup had a charcoal broiled flavor.

A coating mix was prepared containging 79.6% by weight of bread crumbs; 10.5% by weight of spices; 1.2% by weight of gelatin; and 8.7% by weight of encapsulated flavor composition. The flavor composition was encapsulated by melting 95% by weight of solid fat, blending with 5% by weight of the flavor composition, freezing, then grinding the fat mixture. The resultant coating mix was coated onto chicken and baked, resulting in a chicken with a charcoal broiled, meaty, fried chicken flavor and aroma.

EXAMPLE III

The following fats or oils were each subjected to the high temperature treatment in the presence of oxygen as described in Example I, but without the addition of flavor precursors: partially hydrogenated soy oil, partially hydrogenated soy and cottonseed oil, coconut oil, palm oil, beef tallow, safflower oil and peanut oil. The resultant flavor compositions all had charred or charcoal-broiled notes with a light meaty backround.

The addition of any or all of the flavor precursors described in Example I to the fat or oil prior to the high temperature treatment resulted in enhanced charred and meaty or charcoal broiled notes in the flavor composition.

EXAMPLE IV

The flavor composition of Example I at a level of 30% by weight was mixed into solution with 70% by weight of a modified food starch and spray dried. A condiment was prepared by blending 48% by weight of the spray dried flavor composition with 15% by weight of toasted wheat powder, 35% by weight of salt flakes and 2% by weight of tricalcium phosphate. The powdered condiment was then used by applying to foods before or after cooking to impart a charcoal broiled, meaty flavor to the food. This condiment was especially useful for microwave cooking as the brownish color of the condiment also enhanced the desired appearance of the food, as well as providing a charcoal broiled, meaty flavor and aroma.

What is claimed is:

1. A process for preparing a flavor composition comprising providing a flavor producing composition consisting essentially of a fat or oil suitable for producing a charcoal broiled flavor; subjecting a film of said fat or oil to a temperature within the range of 285° C. to 475° C. in the presence of oxygen for a period of time effective to develop a charcoal broiled flavor and collecting the resultant fat or oil.

2. Process of claim 1 wherein the film has a thickness of less than 5 mm.

3. Process of claim 2 wherein the fat or oil is subjected to temperatures within the range of about 340° C. to 360° C.

4. Process of claim 1 wherein the fat or oil is subjected to the temperatures in the presence of oxygen through a continuous feed, thin film, high temperature cooking process.

5. Process of claim 1 further comprising adding flavor precursors to the fat or oil to enhance the flavor development of the flavor composition.

6. Process of claim 5 wherein the flavor precursors are chosen from the group consisting of sulfur containing vegetable, sulfur containing amino acid, ascorbic acid, yeast and combinations thereof.

7. Process of claim 6 further comprising precooking the fat or oil and flavor precursor to combine the fat or oil and flavor precursor prior to subjecting the fat or oil to the high temperature.

8. Process of claim 7 wherein the level of precursors are within the range of 0.5 to 4% for the sulfur containing vegetable, 1 to 6% for the sulfur containing amino acids, 0.5 to 3% for the ascorbic acid and 2 to 8% for the yeast, all percents being by weight of the fat or oil.

9. Process of claim 7 wherein the flavor precursors are chosen from the group consisting of onion, garlic, ascorbic acid, autolyzed yeast, L-cysteine amino acid, thiamin HCL and combinations thereof.

10. Process of claim 9 wherein the level of flavor precursors are within the range of 1 to 2% for the onion, 1 to 2% for the garlic, 1 to 2% for the ascorbic acid, 2 to 4% for the L-cysteine amino acid, 2 to 4% for the thiamin HCL and 3 to 4% for the autolyzed yeast.

11. Process of claim 1 further comprising combining the flavor composition with a carrier.

12. Process of claim 11 wherein the carrier and flavor composition are codried.

13. A process of claim 11 wherein the carrier is chosen from the group consisting of dextrin, gum, starch, modified cellulose, corn syrup solids and fat.

14. Process of claim 13 wherein the flavor composition is fixed in the carrier at a level of 5 to 40% by weight of the carrier-flavor composition.

15. Process of claim 11 further comprising incorporating the flavor composition in a foodstuff chosen from the group consisting of meat, meat analog, sauce, beverage, soup and condiment.

16. Process of claim 1 further comprising incorporating the flavor composition in a foodstuff chosen from the group consisting of meat, meat analog, sauce, soup, beverage and condiment.

17. Process of claim 2 wherein the thickness of the film is less than 1 mm.

18. Product prepared by the process of claim 1.

19. Product prepared by the process of claim 11.

20. Product prepare by the process of claim 16.

* * * * *